United States Patent [19]

Lau et al.

[11] Patent Number: 4,904,517

[45] Date of Patent: Feb. 27, 1990

[54] RIBBED WAFERBOARD PRODUCT

[75] Inventors: Kenneth K. Lau, Vancouver; Robert M. Knudson, Coquitlam, both of Canada

[73] Assignee: MacMillan Bloedel Research, Canada

[21] Appl. No.: 126,019

[22] Filed: Nov. 27, 1987

[51] Int. Cl.⁴ .......................... B27D 1/08; D32B 31/20
[52] U.S. Cl. .................................... 428/167; 428/171; 428/537.1; 428/402
[58] Field of Search ................ 428/537.1, 402, 156, 428/163, 165, 166, 167, 171

[56] References Cited

U.S. PATENT DOCUMENTS

| | | |
|---|---|---|
| 3,083,128 | 3/1963 | Herrington et al. |
| 3,166,617 | 1/1965 | Munk .......................... 428/537.1 X |
| 3,793,125 | 2/1974 | Kunz . |
| 4,061,813 | 12/1977 | Geimer et al. |
| 4,084,996 | 4/1978 | Wheeler . |
| 4,308,308 | 12/1981 | Sachso . |
| 4,355,754 | 10/1982 | Lund et al. .................. 428/537.1 X |
| 4,616,991 | 10/1986 | Bach . |

FOREIGN PATENT DOCUMENTS 0158021 12/1979 Japan ................................. 428/537.1
0671868 11/1965 Netherlands ..................... 428/537.1

Primary Examiner—Nancy A. B. Swisher

[57] ABSTRACT

A ribbed particleboard (waferboard) product having substantially uniform density throughout is provided by forming a mat of wood particles and superimposing on the mat, ribs of such wood particles and then pressing the mat and ribs simultaneously to consolidate the product and provide the ribbed panel having one side substantially planar and the other side ribbed.

7 Claims, 2 Drawing Sheets

RIBBED WAFERBOARD PRODUCT

FIELD OF THE INVENTION

Present invention relates to a panel product, more particularly, the present invention relates to a substantially uniform density ribbed waferboard panel having ribs along one side and a plane surface on the opposite side.

BACKGROUND TO THE PRESENT INVENTION

Structurally reinforced wood particle panels utilizing the shape of the panel itself to provide the reinforcement, are known. A structurally reinforced panel is disclosed in the U.S. Pat. No. 3,083,128 issued Mar. 26, 1963 to Herrington et al. which disclosed a lignocellulose hardboard panel having improved stiffness and dimensional stability and wherein one flat surface is flat or planer and the opposite is formed with a plurality of spaced ribs having a density very significantly lower than the density of the depressed areas (valleys) therebetween. The hardboard panel is produced by pressing a uniform thickness mat so that the depressed areas are squeezed to a thinner, final thickness and thus higher density than the ribbed areas.

Obviously, reinforcing ribs should be as strong as possible if they are to provide a maximum degree of reinforcing. This was recognized by Herrington et al. and in an attempt to provide better reinforcing, Herrington et al operated a press in a manner to produce skins on the surface of the hardboard so that the density adjacent both surfaces were significantly higher than the density in the middle of the board. Obviously, this technique would have limited effect which, in part, would depend on the thickness of hardened surface layer.

The Herrington et al. patent relates to a hardboard formed by the so-called Masonite process wherein the sheet is formed from a specially produced pulp using a wet laying process which lends itself better to deformation and the embossing techniques and the surfacing hardening of the material as described.

Chipboard when it is to be embossed is generally provided with a embossing layer of fine chips as taught, for example, in the U.S. Pat. No. 3,793,125 issued Feb. 19, 1974 to Kunz. In this patent, wafer or chipboard is decorated by applying a layer of fine chips to the surface, overlaying a fine chip layer with a decorative deformable layer and then pressing using a relief carrier.

U.S. Pat. No. 4,061,813 issued Dec. 6, 1977 to Geimer et al. discloses the wood-based building component made of fibers or particles adhesively secured together and shaped in a single pressing to form a flat panel with a plurality of spaced specially shaped channels formed therein.

It has also been taught to form a corrugated shaped board by using a special press on a mat of wood wafers to simultaneously shape and press to consolidate the mat into the corrugated configuration. The press required to do this is relatively complicated (see U.S. Pat. No. 4,616,991 issued Oct. 14, 1986 to Bach).

Of the above described boards only the embossed hardboard of Herrington et al. described in U.S. Pat. No. 3,083,128 has a flat surface on one side and reinforcing rib on the other. However, as the above described, the board of this patent is a hardboard made by wet processing and has significantly different average densities in the skins and center of the panel and in the valley and the rib areas.

U.S. Pat. No. 4,084,996 issued Apr. 18, 1978 to Wheeler describes a plywood panel provided with a plurality of embossed parallel grooves formed therein by a caul plate having a plurality of spaced ridges corresponding to the desired grooves in the panel.

U.S. Pat. No. 4,308,308 describes a ribbed, reinforced fiberous material panel formed, for example, of fiberglass. It is not clear in the patent how the ribs are formed. In any event, the resultant structure is consolidated by heat only without the application of pressure. The patent shows a fiberous product with integral ribs that presumably are of essentially the same density as the valley areas therebetween, however, as above described the product is a cured fiberglass product not a pressed lignocellulose product.

The nonuniform application of pressure when uneven surfaced panels are being consolidated and formed by pressing results in major differences in the densities of various areas of the consolidated product, i.e. the areas pressed the most (thinner areas) have the highest densities while for reinforcing the reverse is more desirable.

BRIEF DESCRIPTION OF THE PRESENT INVENTION

It is an object of the present invention to provide a reinforced waferboard product having reinforcing ribs consolidated therein by pressing and where in the density of the board is essentially the same in the ribbed areas as in the areas between the ribs or if desired the rib areas may be of higher density than the areas therebetween.

Broadly the present invention relates to a particleboard panel comprising a board with one surface thereof substantially planar and an opposite surface thereof having integral ribs separated by valleys, said board being formed by pressing a mat of said particles said mat having ribbed areas of greater thickness spaced by valleys of lesser thickness, said board after pressing and consolidating having a density in the rib areas within 15% of the density in the valley areas.

Preferably, the wood particles are wood wafers. More preferably, the wood wafers will be oriented at least in the layers adjacent the faces of the board with their longitudinal axis (grain direction) substantially parallel to the longitudinal axis of the ribs.

Broadly, the present invention also relates to a method of making consolidated wood particleboard having one surface thereof ribbed comprising laying wood particles coated with binder on a flat supporting caul plate to build up a uniform mat of preselected thickness, applying further of said wood particles coated with binder on said mat at spaced locations thereacross to form spaced projections of said particles on said mat, simultaneously pressing said mat and said projections in a press having a platen contoured to mate with the said projections and said mat between said projections to simultaneously compress and consolidate the wood particles and binder in said mat and said projections substantially to the same degree to produce a board having one substantially planar surface and the opposite surface thereof with ribs, said board in the area of said ribs having an average density within 15% of the average density of the said board in the areas between said ribs and preferably within 10%.

Preferably, the projections will be in the form of substantially parallel spaced continuous ribs.

In one embodiment of the present invention the density in the areas of the projections or ribs on the consolidated board will be substantially the same as the density in the areas therebetween and in another embodiment the density in the areas of the projections will be greater by between 5% and 15% (preferably 5%–10%) than the density in the areas therebetween (the valley areas).

Preferably, the wafers forming at least the surface areas of the board will be oriented to substantially align their longitudinal axes (grain direction) parallel with the longitudinal axes of the ribs.

BRIEF DESCRIPTION OF THE DRAWINGS

Further feature objects and advantages will be evident from the following detailed description of the preferred embodiments of the present invention taken in conjunction with the accompanying drawings in which.

DETAILED DESCRIPTION OF THE PRESENT INVENTION

Figure 1:
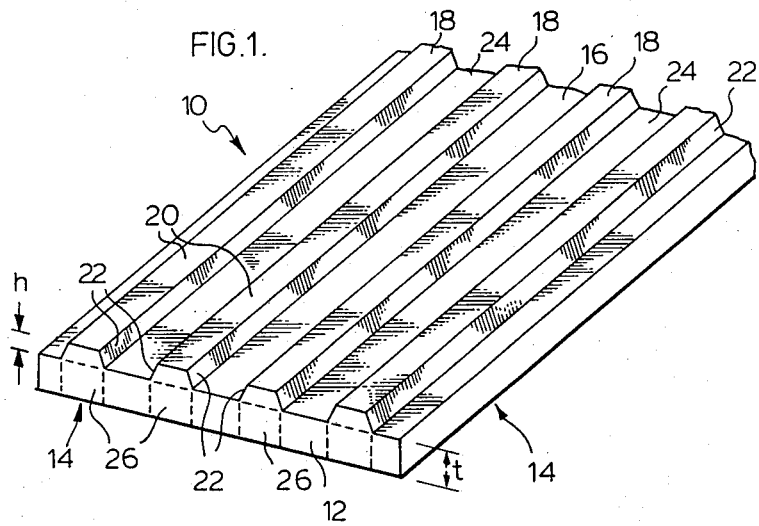
FIG. 1 is an isometric illustration of a ribbed panel formed in accordance with the present invention.

Generally, the present invention is concerned with the manufacture of a waferboard and thus the particles used to form the board will be conventional wood wafers as used in manufacture of waferboard or oriented strandboard or the like. If a high strength product is to be produced it is preferred to use relatively long wafers or strands exceeding about 10 inch in length with their longitudinal axis (which will normally be parallel with the grain direction in the wafer or strand) substantially parallel to the longitudinal axis of the board as taught, for example, in U.S. Pat. No. 4,610,913 issued Sep. 9, 1986 to Barnes.

A board or panel 10 constructed in accordance with the present invention is provided with a main body portion 12 substantially rectangular in cross section and having a planar surface 14 (facing downwardly in FIG. 1) and an opposite substantially parallel surface 16 having ribs 18 projecting therefrom. These ribs 18 extend longitudinally of panel 12 and have, in the illustrated arrangement, an upper surface or free surface 20 substantially parallel the planar surface of the panel 12. The free surface 20 is connected to the surface 16 of the panel 12 via the sidewalls 22 sloping to the surface 16 (and 20).

Interposed between the ribs 18 are valleys 24 having as their bottom surfaces the surface 16 of the panel 12. The ribs 18 are uniformly spaced and are substantially of uniform size as are the valleys 24, in the arrangement illustrated.

The density of the rib areas 18 each include the rib 18 itself plus the area 26 shown in the imaginary rectangle illustrated or outlined by the dotted lines in FIG. 1, i.e. through the thickness of the panel 12 beneath each rib 18 is preferably substantially the same as the density of the panel in the areas of the valley 24, i.e. the areas between the areas 26. If desired density in the rib areas (26 and ribs 18) may be slightly higher than the density of the panel in the areas of the valleys 24, the differences in densities in the rib areas and the valleys 24 must not be too great or the integrity of the board may be affected. In any event, the density of the rib areas of the consolidated board will be within 15% of the average density of the consolidated board in the areas 24 between the ribs.

It is preferred that the densities of the consolidated board in the rib and valley areas be substantially or essentially the same, however, for some applications it may be appropriate to make a clear difference between the densities (strengths) of the rib and valley areas of the board. In some cases the ribs may be deliberately made of higher density, 5% to 15% higher, preferably 5%–10% higher to increase the strength in the ribbed areas to make the board more resistant to bending without disrupting the integrity of the board.

Figure 2:
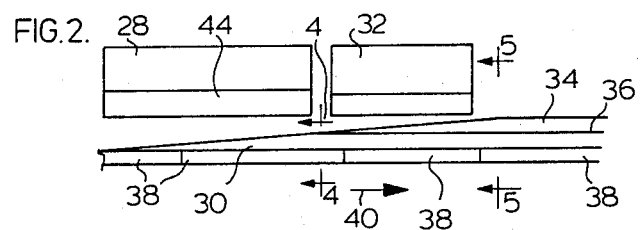
FIG. 2 is a schematic side elevation illustrating the forming heads of the present invention.
Figure 3:
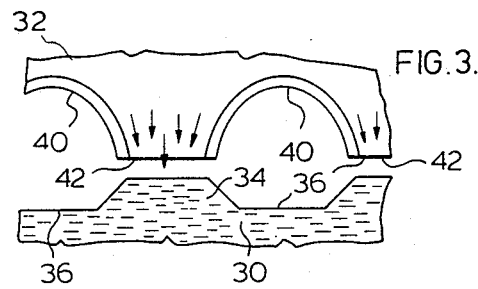
FIG. 3 is a schematic illustration of the deflectors used to lay the ribs on the mat and provide the completed layup.
Figure 4:
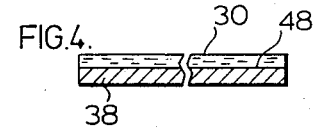
FIG. 4 is a section along the line 4—4 FIG. 2.
Figure 5:
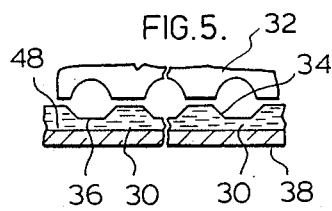
FIG. 5 is a section along the line of 5—5 FIG. 2.

To produce the board of the present invention a uniform thickness mat of wafers is first laid and then a separate mat or projection for each of the discrete ribs 18 is superimposed thereon. This technique is illustrated schematically in FIG. 2 wherein a first forming head 28 lays the wafers to form a substantially uniform thickness mat 30 which is eventually consolidated into the panel 12 and the second forming head 32 forms a plurality of the spaced discrete projections or rib forming mats 34 onto the upper surface 36 of the mat 30. These mats 30 and 34 are formed by depositing the wafers onto a plurality of discrete caul plates 38 moving in the direction of arrow 40 beneath the laying heads 28 and 32.

It will be noted that the projections or rib forming mats 34 are laid directly on the top surface 36 of the mat 30 and thus the wafers of the rib projections 34 interact with the wafers of the main mat 30 as an integral part thereof.

The projections or rib forming mats 34 are produced by a special forming head having curved baffles 40 directing the wafers through spaced narrow openings 42 to form the projections 34 adapted to be consolidated to form the ribs 18. The openings 42 are slightly narrower than the desired base on the projections or rib forming mats 34 so that the wafers forming the projections 34 fall onto the surface 36 and build up a tapered projection in accordance with the angle of repose of the wafers.

Figure 8:
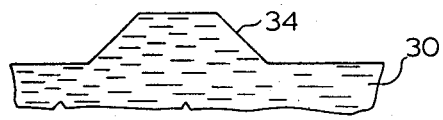
FIG. 8 is a partial end view of a laying head for forming one of the ribs and incorporating a particle orienting device.

It is preferred that the wafers be oriented, i.e. have their longitudinal axis substantially parallel to the longitudinal axis of the panel 12 (and ribs 18) and for this reason the laying head 28 may be provided with a suitable orienting section 44 to orient the wafers as they fall to form the mat 30. Similarly, forming head 32 may be provided with discrete orienting devices 46 (FIG. 8) positioned beneath the opening 42 to orient the wafers falling through the passages or slots 42 so that the wafers forming the projections or rib forming mats 34 are also oriented in the same manner as the wafers forming the main mat 30. In many cases, a separate orienter 46 may not be necessary as the tapered baffles 40 and the widths of the slots 42 may combine and function as orienters and orient the wafers passing therethrough and forming the projections or rib forming mats 34.

The platens 38 are flat as illustrated in FIGS. 2, 4, 5 and 6 and have planar surfaces so that the bottom surface of the mat 30 (see FIGS. 4 and 5) corresponds with the upper surface 48 of the platen 38 and forms the planar surface 14 of the finished product 10.

It will be apparent that a special press is necessary to press the layup of the mat formed of a combination of a substantially standard uniform thickness mat 30 having projections or rib forming mats 34 superimposed thereon. This is provided by an insert 55 fixed to bottom surfaces 52 of each press platen 54 which forms the top surface of the press opening. The insert 55 is formed with alternating lands 56 and valleys 58 positioned and shaped so that the valleys 58 generally correspond with the projections or rib forming mat sections 34 and the land areas 56 are position therebetween as will be described in more detail hereinbelow.

Figure 6:
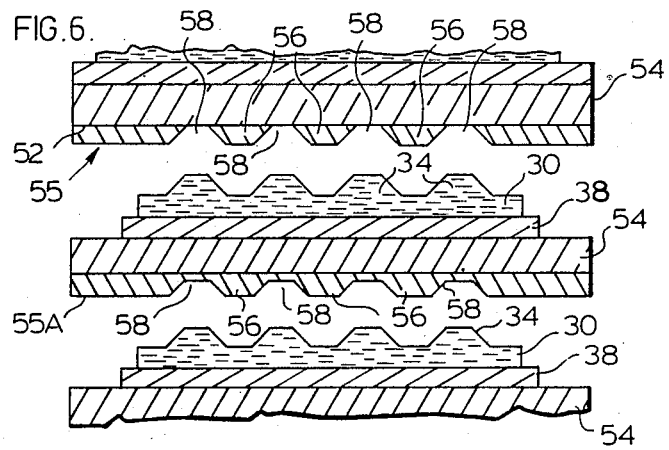
FIG. 6 is an end view illustrating the press with two different versions of upper platen showing the ribbed layup in position for pressing.

The bottom surface of the upper press in Figure 6 has an insert 55 in which the lands are provided by discrete land inserts 56 secured directly to the platen 54 with the surface of platen 54 forming the top of the grooves or valleys. The insert 55A shown on the bottom surface of the upper platen for the lower press opening is a continuous insert with grooves formed therein to form the lands 56 and valleys 58.

It will be apparent that it is important to align the projections or rib forming mat sections 34 with the grooves or valleys 58 to obtain proper pressing and consolidation of the mat 30 (34) into the consolidated panel. It is important to apply heat to the mat 30 (34) as uniformly as possible so that the adhesive which typically will be a phenol formaldehyde-type adhesive coating the wafers may cure uniformly through the mat and form a uniformly cured board or panel 10. Thus, it is important that the insert 55 or 55A be in and remain in direct communication with the surface 52 of the platen 54 so that heat may be readily transferred from the platen 54 to the insert 55 or 55A and the insert remains at essentially the same temperature as platen 54 and functions in effect is an integral part of the platen for heat transfer purposes. It is also important that the insert 55 or 55A be a good heat conductor to ensure the proper transfer of heat from platen 54 to mat 30 (34). If a nonuniform thickness platen is moved in and out of the heated press with the mat there will likely be nonuniform heating of the mat as the thicker areas of the platen will not transfer heat as quickly as the thinner areas of the platen.

Figure 7:
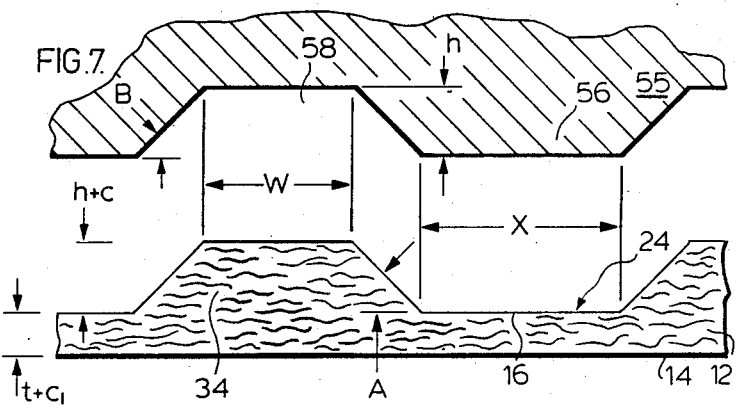
FIG. 7 indicates the dimensions of the consolidated board and of the upper platen used for consolidation in the press.

The precise dimensions of the mat 30 (34) are not critical, however, they should be matched reasonably well with the corresponding dimensions in the insert 55. As shown in FIG. 7 the width of the top of the projections or ribbed forming mat sections 34 indicated as W correspond with the width of the base of the groove 58 in the insert 55 (or 55A). Similarly, the width of the valleys between the rib forming areas 34 is indicated by the distance X correspond with the width of the land areas 56. However, the height h, i.e. difference in elevation between the land areas 56 and valleys 58 is less than the height of mat sections 34 above the mat 30 since these mat sections 34 must be compressed to a degree generally at least equal to that of the areas of the valleys 24 to obtain the desired density and consolidation. In other words the percent reduction in height of the valley areas and rib areas will normally be about the same.

The height of the mat section 34 above the mat 30 is indicated as $h+C$ where C corresponds the amount of compression to occur in the rib forming mat portions 34 to form the consolidated ribs 18 having the height h above the surface 16 of the valleys 24. Similarly, the thickness of the mat 30 will be equal to the thickness t of the rectangular cross section portion of panel of the panel 12 (i.e. spacing between surfaces 14 and 16) plus an amount equal to $C_1$ to ensure that the proper consolidation occurs in the valley portions 24 of the product.

The thicknesses C and $C_1$ normally will be the same if same density is required in the rib areas as in the areas therebetween and the height h is equal to the thickness t so that the amount of the rib forming mat sections 34 have to be compressed to be equal in density to the other areas of the mat is essentially twice the amount that the sections 56 compress the mat 30 to form the valleys 24. If the height h is less than the thickness t, then the value for C will generally be less than that of $C_1$. If a higher density is desired in the rib portions 18 and areas 26 then the proportions or relationship of thickness dimension $C_1$ to thickness dimension C will be adjusted to obtain the desired difference in density.

The angle A will normally be the angle of repose at the wafers, but the angle B is determined primarily by the height h and will not be the same as angle A. The width of the valleys 58 are shown equal to the width w of the top of the mats 34 but the width of the valleys 58 could differ from that of the mats 34. For example, if the widths of the valleys 58 are slightly wider than that of the mats 34 it will have little consequence to the consolidated board as long as the ribs retain their shape. However, if the width of valleys 58 is significantly less than that of the mats 34 (ribs) local high density areas at the sides of the ribs would result which if there is a large difference in density and could affect the integrity of the consolidated board. Preferably the width of the land areas 56 will be equal to the width of the valleys, if the land areas 56 are smaller than the valleys there will be uncompressed (not properly consolidated) areas adjacent the ribs and if the areas 56 are wider than the valleys there may be overcompressed areas adjacent the ribs.

It is believed that the operation of the present invention should be apparent from the above description. However, to briefly review, first a mat 30 is formed on caul plates 38, then discrete rib forming mats 34 are laid thereon via the head 32, the caul plates 38 carrying the mats 30 (34) are then transferred to a press wherein the rib forming mat sections 34 align with grooves 58 formed in a heated insert 55 (55A) in the upper platen and the complete mat 30 (34) is pressed at elevated temperature to form a completed consolidated product having ribs 18 extending along one side thereof and a substantial planar surface 14 on the other.

As above indicated, the wafers used may be oriented as desired, preferably, all (in the mats 30 and 34) with their longitudinal axis aligned with that of the ribs 18. Alternatively, only the wafers forming the ribs may be aligned in this direction with the wafers forming the main body of the panel 12 being random oriented or the main body of panel 12 may have discrete layers with the wafers thereof oriented in different directions some layers with the wafers oriented longitudinally and some layers with the wafers oriented transverse to the longitudinal axis of the ribs 18.

Having described the invention, modifications will be evident to those skilled in the art without departing from the spirit of the invention as defined in the appended claims.

We claim:

1. A consolidated, structurally reinforced wood waferboard consolidated under elevated temperature and pressure conditions comprising a structurally reinforced consolidated elongated panel having one major surface thereof substantially planar and an opposite major surface thereof provided with longitudinally extending, outwardly projecting, substantially parallel integral ribs having intervening longitudinally extending substantially parallel valleys therebetween, said panel being formed by pressing at elevated temperature a mat of elongated wood wafers coated with adhesive, said mat having one major surface thereof substantially planar and having rib forming projections composed of said wood wafers coated with adhesive extending from a second major surface of said mat opposite said one surface of said mat to provide a mat having rib forming areas of a first thickness spaced by valley forming areas of said composite mat of a second thickness less than said first thickness, said consolidated panel having a density in the area of said ribs within 15 percent of the average density of said consolidated panel in the areas of said valleys, said elongated wafers at least in said areas of said ribs being oriented with their longitudinal axes substantially parallel to the longitudinal axes of said ribs.

2. A board as defined in claim 1 wherein said wafers in said consolidated panel at least adjacent said planar and said opposite surfaces of said consolidated panel are also oriented with their longitudinal axes substantially parallel to the longitudinal axes of said ribs.

3. A board as defined in claim 2 wherein said wafers are at least 10 inches long.

4. A board as defined in claim 1 wherein said density of said rib areas is within 10 percent of the density of said valley areas of said consolidated panel.

5. A board as defined in claim 4 wherein said density of said rib areas and said density of said valley areas are substantially the same.

6. A board as defined in claim 1 wherein said density in said rib areas of said consolidated panel is greater than the density of said consolidated panel in said valley areas by 5 to 15 percent.

7. A board as defined in claim 6 wherein said density in said rib areas is greater than the density of said valley areas by 5% to 10%.

* * * * *